Jan. 10, 1967  T. F. SARAH  3,297,275
CRANK OPERATED DRAG FOR FISHING REELS
Filed July 24, 1964  2 Sheets-Sheet 1

INVENTOR.
THOMAS F. SARAH
BY Hamilton & Cook
ATTORNEYS

Jan. 10, 1967   T. F. SARAH   3,297,275
CRANK OPERATED DRAG FOR FISHING REELS
Filed July 24, 1964   2 Sheets-Sheet 2

INVENTOR.
THOMAS F. SARAH
BY *Hamilton & Cook*
ATTORNEYS ns. 3,297,275
CRANK OPERATED DRAG FOR FISHING REELS
Thomas F. Sarah, Akron, Ohio, assignor to Pflueger Corporation, Akron, Ohio, a corporation of Ohio
Filed July 24, 1964, Ser. No. 384,835
5 Claims. (Cl. 242—84.45)

The present invention relates generally to brake mechanisms. More particularly, the present invention relates to brake mechanisms for regulating the drag of a fishing reel. Specifically, the present invention relates to a brake, or drag, mechanism variable by a partial turn of the crank handle as well as a star wheel.

The purpose of a brake, or drag mechanism, in a fishing reel is to allow the line to pay out when the pull exerted by the fish overcomes a selective frictional resistance of the drag. A conventional drag mechanism comprises friction disks interposed between the crank handle and the drive gear in such manner that a friction drive is provided for retrieving the line. The amount of friction, or drag, is adjusted by turning an adjusting knob, commonly in the form of a star wheel, on the exterior of the reel, so that the fisherman can play the fish by allowing it to run, and so that the line does not break when the pull of the fish exceeds the strength of the line.

Properly to play a fish may require repeatedly decreasing the amount of drag to let the fish run and alternately increasing the amount of drag to permit selective retrieving of the line. With the conventional reel this selective control of the drag is difficult to effect because the fisherman is already using one hand to support the pole and the other hand to operate the crank handle. Therefore, one hand, generally that operating the crank handle, must shift from its normal duty to the star wheel to adjust the drag. Many a fish has been lost because the fisherman momentarily lost control of the fish while adjusting the drag.

To alleviate this difficulty fishing reels have been constructed which permit some variation in the drag by a partial rotation of the crank handle itself. Even in the best known of these prior art devices it has been necessary to provide an interengaging, or interlocking, means between the crank handle and the main drag adjusting control knob. Therefore, if the fisherman desires to adjust the amount of drag with the main control knob, or star wheel, he would first be required to release the interlock and then turn the knob. This releasing of the interlock has heretofore been accomplished in one of two ways. By one construction the interlock is released by first axially translating the control knob to disengage interfitting interlock lugs and then turning the knob to adjust, or regulate, the drag, but this additional translation of the knob only compounds the difficulties attendant upon such an operation in the above-mentioned conventional reels.

A second prior known construction releases the interlocking lugs by the use of a complex cam arrangement positioned so as to effect the necessary axial translation of the main control knob as it is itself rotated.

It is therefore an object of the present invention to provide an improved means for regulating the drag either by rotation of the crank handle or by turning a star wheel.

It is another object of the present invention to provide an improved drag mechanism, as above, in which the amount of drag can be decreased by a partial reverse turning of the crank handle and be increased by a partial forward turn of the crank handle against the retrieving resistance opposed on the line by the fish.

It is still another object of the present invention to provide a crank operated drag mechanism, as above, in which the drag can also be varied by turning the star wheel without first releasing an interlock, either manually or by elaborate cam means.

It is a further object of the present invention to provide a crank operated drag mechanism, as above, having a lesser number of parts which are themselves less expensive, so that the drag and its operating mechanism is economical to manufacture and yet is durable in use.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

Figure 1:
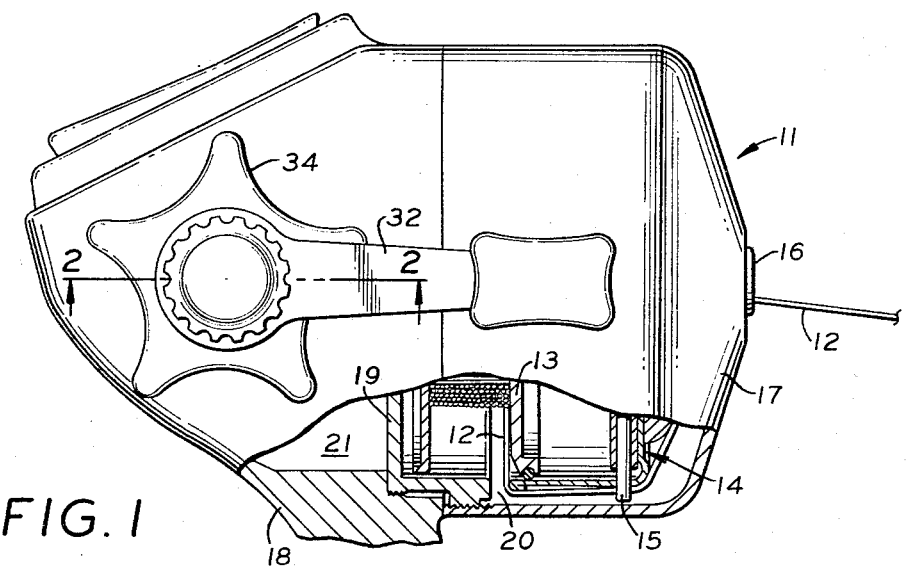
FIG. 1 is a side elevation, partly broken away, of a closed face spinning reel embodying the subject improved drag operating mechanism.

In general, a fishing reel embodying the concepts of the present invention has a shank journaled in the housing for both rotation and at least limited axial translation with respect thereto. A crank handle is nonrotatably attached to the portion of the shank extending exteriorly of the housing and a spindle is threaded onto the portion of the shank interiorly of the housing. The crank handle and shank are rotatable in both a forward and reverse direction. The spindle supports the main drive gear of the reel as well as the drag mechanism.

The shank is rotatable forwardly with and with respect to the spindle, but an anti-reverse rotation pawl prevents the spindle from rotating reversely with the shank. A stop means is provided to limit the rotation of the shank with respect to the spindle, both forwardly and reversely.

A shoulder means is provided within the housing against which the drag mechanism is compressed to increase the drag and away from which the drag mechanism is moved to decrease the drag. A main drag adjusting control knob, or star wheel, is threadably mounted on the shank between the housing and the crank handle. Rotation of the star wheel adjusts the initial drag. Forward rotation of the crank handle retrieves the line or selectively, in cooperation with the retrieving resistance offered by the line, increases the drag. A partial reverse rotation of the crank arm decreases the drag.

Referring more particularly to the drawings, the improved drag operating mechanism, indicated generally by the numeral 10, is disclosed in conjunction with a closed face spinning reel 11. While the subject mechanism is readily adaptable to most known crank operated fishing reels, it is shown in conjunction with a closed face spinning reel since in such a reel the line 12 must make several sharp turns as it passes from the spool 13 over the rotatable flyer 14, around the pickup pin 15 on the flyer 14, and out the eyelet, or guide opening, 16 in the cap 17 which forms the closed face. These sharp turns, or bends, in the line increase the stress in the line, both when the fish is allowed to run against the snubbing force applied by the line and when the fish is retrieved. Accordingly, when playing a fish, and particularly with a closed face spinning reel, the fisherman may repeatedly decrease the amount of drag, to let the fish run, and alternately increase the amount of drag in order to retrieve the line against the resistance imposed by the fish.

The cap 17 is screwed, or otherwise attached, to the reel housing 18 which is preferably divided, by a partition wall 19, into a spool compartment 20 and a gear compartment 21. If more details are desired as to the construction and operation of a closed face spinning reel of this nature, one can refer to my prior U.S. Patent No. 3,025,020, which issued on March 13, 1962.

Figure 2:
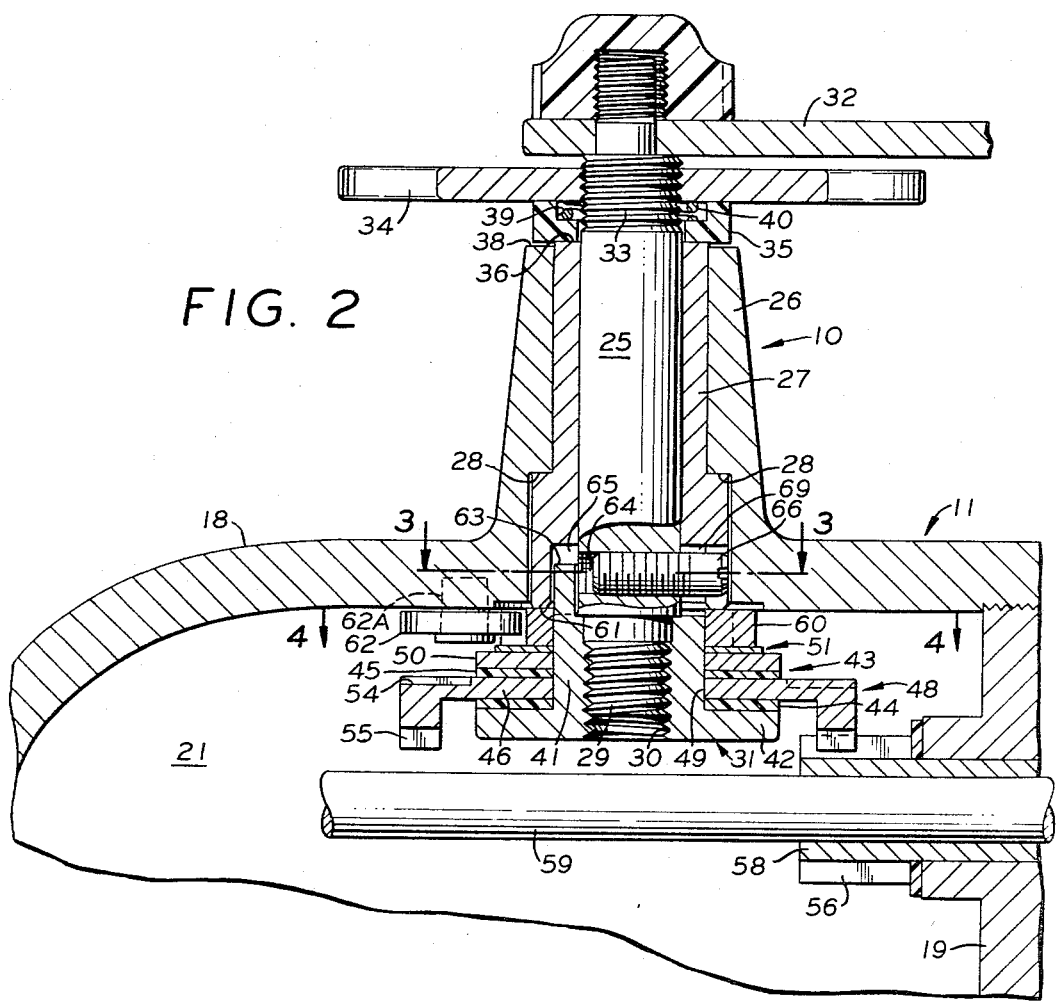
FIG. 2 is an enlarged cross section taken substantially on line 2—2 of FIG. 1.

As best shown in FIG. 2, a shank 25 is journaled in a boss 26 formed as a part of the housing 18. For ease of operation a sleeve journal 27 is preferably interposed between the shank 25 and the boss 26. The sleeve journal 27 is rotatable with the shank 25 and is retained against axially outward movement, as by engaging shoulders 28. However, the journal 27 permits at least limited axial translation of the shank 25 with respect thereto, as is more fully hereinafter described.

That portion, or first end, of the shank 25 which lies interiorly of the gear compartment 21 is threaded, as at 29. Matingly engaging threads are provided on the interior of a bore 30 axially oriented through the spindle 31 carried on the shank 25.

That portion, or second end, of the shank 25 which extends exteriorly of the housing 18 nonrotatably mounts a crank handle 32 by which forward and reverse rotation of the shank 25 can be effected. That portion of the shank 25 between the crank handle 32 and the housing 18 is also provided with threads 33 upon which is mounted a main control knob 34. Of course, the control knob 34 may have any shape which is satisfactory for ease of operation, but the standard star wheel form is generally accepted as being most suitable.

A washer 35 is positioned against the axially outer face 36 of the journal 27, which, incidentally, lies in a plane preferably axially outwardly of the axially outer face 38 of the hub 26 to prevent unnecessary friction against the hub 26 as the shank is rotated. As shown, the washer 35 may be cup-shaped into the cavity 39 of which is positioned a spring 40. The spring 40 is constructed to keep the washer in contact with the face 36 of the journal 27 at all times during selective axial translation of the shank 25 with respect to the journal 27.

Referring again to the spindle 31, it can be seen from the drawings that it comprises a barrel portion 41 from the axially innermost end of which extends a radially outwardly directed flange 42. The drag mechanism, indicated generally by the numeral 43, is positioned radially around the barrel portion 41 and axially against the flange 42.

The drag mechanism 43 includes a pair of frictional brake disks 44 and 45 which may be made of nylon, or other suitable material. The web portion 46 of the main drive gear 48 is sandwiched between these brake disks 44 and 45. The hub, or central portion, of the web 46 is bored, as at 49, to permit rotation of the drive gear 48 with respect to the spindle 31.

Brake disk 44 lies axially inwardly of the web portion 46 against the flange 42, and the brake disk 45 lies axially outwardly of the web portion 46 against the compression washer 50 which is nonrotatably, but axially slidable on, the barrel portion 41 of spindle 31.

Figure 4:
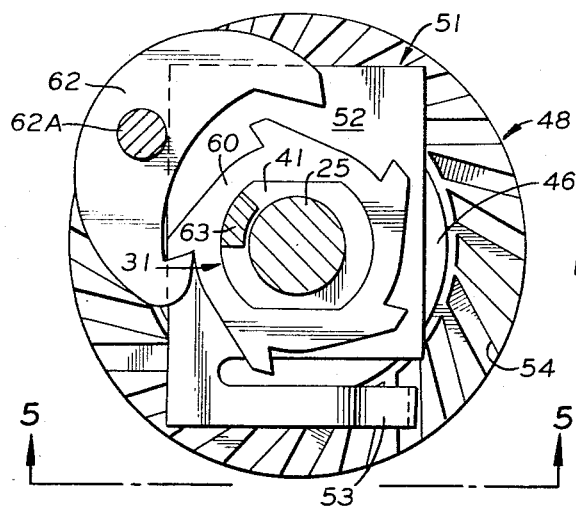
FIG. 4 is an enlarged cross section taken substantially on line 4—4 of FIG. 2.
Figure 5:
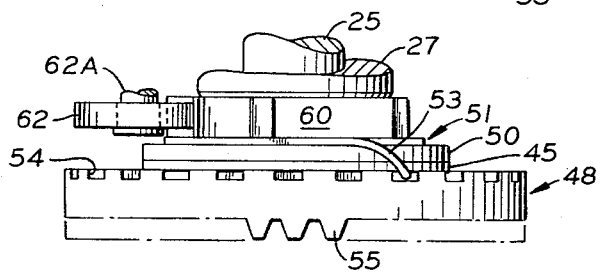
FIG. 5 is a partial side elevation taken substantially on line 5—5 of FIG. 4.

Stacked in abutting relation axially outwardly of the compression washer 50 is click spring 51. The flat body portion 52 (FIG. 4) of the click spring 51 is splined on the barrel portion 41 of spindle 31 to be nonrotatable, but at the same time to be axially translatable, with respect thereto. A spring arm 53 extends axially inwardly from the body portion 52 and engages an annular and of serrations 54 on the drive gear 48. Thus, the spring arm 53 produces an audible clicking sound to warn the fisherman at any time when the drive gear rotates relative to the spindle 31.

On the reverse side of the drive gear from the serrations 54 are the drive teeth 55. These drive teeth 55 mesh with the teeth 56 provided around the periphery of a pinion 58 nonrotatably secured to the drive shaft 59. The drive shaft 59 and pinion 58 are journaled in and pass through the partition wall 19 operatively to drive the flyer 14, as more fully shown in my heretofore mentioned U.S. Patent No. 3,025,020.

Reverting again to the drag mechanism 43, an anti-reverse ratchet wheel 60 is also nonrotatably splined on the barrel portion 41 of spindle 31 for axial movement with respect thereto. One side of the ratchet wheel 60 abuts the body portion 52 of the click spring 51, and the other side is engaged by a shoulder 61 within the housing. As shown, the axially inner periphery of the sleeve journal 27 forms the shoulder 61. An anti-reverse pawl 62 is rockably mounted on the housing 18, as by stud 62A, to engage the ratchet wheel 60 and permit rotation of the spindle 31 in a line retrieving direction and prevent reverse rotation thereof.

A unique stop means is also provided to limit the degree of rotation of the shank 25 with respect to the spindle 31. A lug 63 extends from the barrel portion 41 axially along the shank 25 to approximately the center of a threaded bore 64 provided transversely the axis of shank 25. This lug 63 is received in an annular recess 65 in the axially innermost end of the sleeve journal 27 between the shoulder 61 and the shank 25. A pin 66 is threadably received in the bore 64 and extends radially outwardly of the shank 25 to engage the lug 63 after a predetermined rotation of the shank 25 with respect to the spindle 31.

The drag operating mechanism is assembled by mounting the components of the drag mechanism 43 into proper stacked relationship along the barrel 41 of the spindle 31. The spindle 31 is then screwed onto the threads 29 on the first end of the shank 25, preferably until the shank bottoms in the spindle. Then the spindle is backed off at least 180° until the lug 63 is viewable through the bore 64. In this position, the pin 66 is screwed into the opposite end of the bore 64 from the lug 63 with the head portion thereof extending radially outwardly of the shank 25 sufficiently to engage the lug 63 to limit the degree of rotation of the shank 25 with respect to the spindle 31.

When the shank 25, thus assembled to the spindle 31 and drag mechanism 43, is inserted into its sleeve journal 27, the head portion of the pin 66 is received in an axial slot 69 provided in the shoulder portion 61 of sleeve 27. The axial extent of slot 69 must be sufficient to permit the required axial translation of the shank 25 necessary to adjust the initial drag as explained below.

After the aforesaid assemblage is positioned through the hub 26 the washer 35, spring 40, star wheel 34 and crank handle 32 are mounted on the axially outer end of the shank 25 to complete the assembly.

To operate the reel 11 the fisherman initially adjusts the drag in accordance with the test of the line and the size of the fish expected. This initial adjusting is accomplished by rotation of the star wheel 34. To increase the drag the star wheel 34 is turned so that the shank 25 and the spindle 31 mounted thereon are translated axially outwardly, compressing the drag mechanism 43 between the flange 42 and the shoulder 61. To initially decrease the drag the star wheel would be reversely turned.

After the initial adjustment of the drag has been made the fisherman may cast, and the line will be retrieved by forward rotation of the crank handle 32. After a strike has been made, and the fish hooked, it may be that the drag has been initially properly set so that the fish can run with no further adjustment of the drag mechanism and then retrieved by turning the crank handle forwardly. However, it may be that the drag should be reduced to permit the fish to run. The drag can be decreased by a partial reverse rotation of the crank handle 32.

As the crank handle 32 is reversely turned, the anti-reverse ratchet wheel 60 and pawl 62 prevent the gear 48 and the spindle 31 to which it is splined from turning, and the threads 29 on the axially inner end of shank 25 unscrew to permit the flange 42 to move away from the shoulder 61, decreasing the compression on the drag mechanism 43 and thereby reducing the drag.

The amount that the drag can be reduced by reversely turning the crank handle 32 is limited by the degree of relative rotation available between the shank 25 and the spindle 31, as determined by engagement of the pin 66 with the lug 63. If further decrease is desired, the star wheel 34 may be turned accordingly. Of course, it is more convenient to control the drag, when playing a fish, with the crank handle, but the star wheel can be used directly without the necessity of first releasing an interlock when using a reel constructed according to the concept of the present invention.

So long as the retrieving resistance applied by the fish and line is less than the resistance of the drag mechanism 43, forward rotation of the crank handle will retrieve the line. However, when the retrieving resistance is greater than the drag resistance, as will be evidenced by the audible clicking of the click spring 51, the fisherman may selectively let the line run, or he may increase the drag by a partial forward rotation of the crank handle 32. Partial forward rotation of the crank handle 32 when the line resistance is greater than the drag resistance causes the shank 25 to turn with respect to the spindle 31 such that the threads 29 turn into the bore 30, thus decreasing the distance between the flange 42 and shoulder 61 to increase the compression on the drag mechanism and increase the drag.

Figure 3:
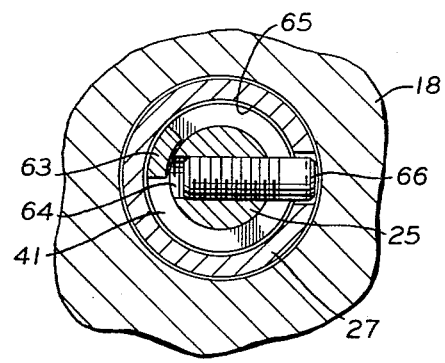
FIG. 3 is a cross section taken substantially on line 3—3 of FIG. 2.

Here too the degree of relative rotation between the shank 25 and the spindle is limited by the stop of the pin 66 against the lug 63. With the drag operating mechanism assembled in the manner described above, and as best shown in FIG. 3, the shank 25 may be rotated approximately 180° in either direction with respect to the spindle before the pin 66 and lug 63 engage.

It should thus be apparent that the present invention provides a relatively simple construction for providing selective drag control by either the crank handle or the star wheel and otherwise accomplishes the objects of the invention.

What is claimed is:

1. In a fishing reel for paying out and retrieving line having a housing, a shank journaled for rotation in said housing and having a first end interiorly of said housing and a second end exteriorly of said housing, a crank handle nonrotatably attached to the second end of said shank and rotatable therewith in a forward and reverse direction, a first thread means on the first end of said shank and a second thread means axially inwardly of said second end, a spindle threaded into said first thread means for selective rotation with and with respect to said shank, ratchet means connected between said housing and said spindle to permit the spindle to rotate with said shank when the latter is rotated to retrieve line and to maintain said spindle in stationary position when said shank is reversely rotated, a drag mechanism carried on said spindle, a star wheel, said star wheel threaded onto said second thread means between said crank handle and said housing, rotation of said star wheel in one direction with respect to said shank translates said shank and spindle to increase the drag afforded by said drag mechanism, rotation of said star wheel in a reverse direction reversely translates said shank and spindle to decrease the drag afforded by said drag mechanism, forward rotation of said crank handle rotates the shank with the spindle to retrieve the line when the resistance offered by the line is less than the drag and forward rotation of said crank handle when the resistance offered by the line is at least equal to the drag rotates the shank with respect to the spindle to translate the spindle along said first thread means to increase the drag, reverse rotation of said crank handle reversely translates said spindle to decrease the drag, and stop means for limiting the degree of axial translation of said spindle.

2. In a fishing reel for paying out and retrieving line having a housing, a shank journaled for rotation in said housing and having a first end interiorly of said housing and a second end exteriorly of said housing, a crank handle nonrotatably attached to the second end of said shank and rotatable therewith in a forward and reverse direction, a first thread means on the first end of said shank and a second thread means axially inwardly of said second end, a spindle threaded into said first thread means for selective rotation with and with respect to said shank, ratchet means connected between said housing and said spindle to permit the spindle to rotate with said shank when the latter is rotated to retrieve line and to maintain said spindle in stationary position when said shank is reversely rotated, a drag mechanism carried on said spindle, a star wheel, said star wheel threaded onto said second thread means between said crank handle and said housing, rotation of said star wheel in one direction with respect to said shank translates said shank and spindle axially outwardly with respect to said housing to increase the drag afforded by said drag mechanism, rotation of said star wheel in a reverse direction reversely translates said shank and spindle to decrease the drag afforded by said drag mechanism, forward rotation of said crank handle rotates the shank with the spindle to retrieve the line when the resistance offered by the line is less than the drag, forward rotation of said crank handle when the resistance offered by the line is at least equal to the drag rotates the shank with respect to the spindle to translate the spindle axially outwardly with respect to said housing along said first thread means to increase the drag, reverse rotation of said crank handle translates said spindle axially inwardly with respect to said housing to decrease the drag, and stop means for limiting the degree of axial translation of said spindle.

3. In a fishing reel for paying out and retrieving line having a housing, a shank journaled for rotation in said housing and having a first end interiorly of said housing and a second end exteriorly of said housing, a crank handle nonrotatably attached to the second end of said shank and rotatable therewith in a forward and reverse direction, a first thread means on the first end of said shank and a second thread means axially inwardly of said second end, a spindle, said spindle having a radially directed flange means and an axial bore, said axial bore threaded for mating engagement with said first thread means on said shank so that said spindle is rotatable with, and selectively with respect to, said shank, ratchet means connected between said housing and said spindle to permit the spindle to rotate with said shank when the latter is rotated to retrieve line and to maintain said spindle in stationary position when said shank is reversely rotated, a shoulder means positioned in said housing in axial opposition to said flange means, a drag mechanism, said drag mechanism carried on said spindle between said flange and said shoulder means, a star wheel, said star wheel threaded onto said second thread means between said handle and said housing, rotation of said wheel in one direction with respect to said shank translates said flange means with respect to said shoulder to increase the drag afforded by said drag mechanism, rotation of said star wheel in the other direction reversely translates said flange means with respect to said shoulder to decrease the drag, forward rotation of said crank handle rotates the shank with the spindle to retrieve the line when the resistance offered to the line is less than the drag, forward rotation of said crank handle when the resistance offered by the line is at least equal to the drag rotates the shank with respect to the spindle to translate the flange means with respect to said shoulder to increase the drag, reverse rotation of said crank handle reversely translates said flange to decrease the drag, and stop means for limiting the degree of axial translation of said flange.

4. In a fishing reel for paying out and retrieving line having a housing, a shank journaled for rotation in said housing having a first end interiorly of said housing and a second end exteriorly of said housing, a crank handle nonrotatably attached to the second end of said shank and rotatable therewith in a forward and reverse direction, a first thread means on said shank in proximity to said first end, a spindle, said spindle having thread means matingly engaging said first thread means on said shank, the hand of said first thread means providing a lead axially inwardly of said first end for forward rotation of said crank handle, pawl means operatively connected between said housing and said spindle to permit only forward rotation of said spindle, a drag mechanism carried on said spindle, shoulder means positioned in said housing radially of and axially inwardly of the first end of said shank, a second thread means on said shank between said crank handle and said housing, a star wheel attached onto said second thread means, rotation of said star wheel in one direction axially translates said shank and spindle to compress said drag mechanism against said shoulder means and thereby increase the drag, reverse rotation of said star wheel reversely translates said shank and spindle to decrease the drag, forward rotation of said crank handle when the retrieving resistance of said line is less than the drag afforded by said drag mechanism rotates said shank with said spindle, forward rotation of said crank arm when the retrieving resistance of said line is at least equal to the drag rotates said shank with respect to said spindle, and stop means to limit both the forward and reverse rotation of said shank with respect to said spindle.

5. A fishing reel, as set forth in claim 4, in which the stop means comprises a stop pin attached to and extending radially outwardly from said shank, a lug, said lug attached to said spindle and extending axially along said shank to be engaged by said stop pin upon selective rotation of said shank with respect to said spindle.

References Cited by the Examiner

UNITED STATES PATENTS

| | | | |
|---|---|---|---|
| 2,896,874 | 7/1959 | Nurmse | 242—84.45 |
| 2,977,065 | 3/1961 | Holahan | 242—84.54 |
| 3,143,315 | 8/1964 | Harrington et al. | 242—84.45 |
| 3,223,349 | 12/1965 | Holahan | 242—84.45 |

FRANK J. COHEN, *Primary Examiner.*

B. S. TAYLOR, *Assistant Examiner.*